United States Patent [19]
Li et al.

[11] Patent Number: 4,953,234
[45] Date of Patent: Sep. 4, 1990

[54] IMPACT RESISTANT HELMET

[75] Inventors: H. L. Li, Parsippany; D. C. Prevorsek, Morris Township, Morris County, both of N.J.

[73] Assignee: Allied-Signal Inc., Morris Townshihp, Morris County, N.J.

[21] Appl. No.: 377,807

[22] Filed: Jul. 10, 1989

Related U.S. Application Data

[63] Continuation of Ser. No. 7,081,075, Aug. 3, 1987, abandoned.

[51] Int. Cl.$^5$ .............................................. B32B 5/00
[52] U.S. Cl. .......................................... 2/412; 2/2.5; 428/113; 428/286; 428/911
[58] Field of Search .................... 2/410, 411, 412, 414, 2/2.5; 428/911, 113, 286

[56] References Cited

U.S. PATENT DOCUMENTS

| | | | |
|---|---|---|---|
| 2,420,522 | 5/1947 | Daly | 2/412 X |
| 4,079,161 | 3/1978 | Kile | 428/220 |
| 4,199,388 | 4/1980 | Tracy et al. | 156/166 |
| 4,309,487 | 1/1982 | Holmes | 428/516 |
| 4,403,012 | 9/1983 | Harpell et al. | 428/290 |
| 4,457,985 | 7/1984 | Harpell et al. | 428/224 |
| 4,501,856 | 2/1985 | Harpell et al. | 525/240 |
| 4,543,286 | 9/1985 | Harpell et al. | 428/288 |
| 4,584,347 | 4/1986 | Harpell et al. | 525/119 |
| 4,596,056 | 6/1986 | Grick | 2/412 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,663,101 | 5/1987 | Kavesh et al. | 264/178 F |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/252 |

FOREIGN PATENT DOCUMENTS

| | | |
|---|---|---|
| 0197279 | 10/1986 | European Pat. Off. .................. 2/2.5 |
| 2927653 | 1/1981 | Fed. Rep. of Germany . |
| 1114951 | 4/1956 | France . |
| 2098852 | 12/1982 | United Kingdom . |
| 2158471 | 11/1985 | United Kingdom . |

OTHER PUBLICATIONS

Liable, Ballistic Materials and Penetration Mechanics, Elsevier Scientific Publishing Company, Chapter 4 (1980).

Roy C. Liable et al., J. Macromel Sci. Chem., A7 (1), pp. 295-322, 1973.

John V. E. Hansen and Roy C. Liable, Flexible Body Armor Materials, Fiber Frontiers ACS Conference, Jun. 10-12, 1974, NTIS Publication ADA018 958.

New Materials in Construction for Improved Helmets, A. L. Alesi et al., M. R. Lilyquist et al., J. Macromel, Sci. Chem., A7 (1) 203 et seq., (1973).

Williams et al., The Impact Strength of Fibre Composites, Journal of Materials Science, vol. 8, pp. 1765-1787, (1973).

Silverman, Effect of Glass Fiber Length on the Creep and Impact Resistance of Reinforced Thermoplastics, Polymer composites, vol. 8, No. 1, pp. 34-41, (Feb. 1987).

Alesi, Aramid Fiber-Reinforced Ionomer, Polymer Engineering and Science, vol. 18, No. 16, pp. 1209-1215, (Dec. 1978).

Roylance et al., Ballistic Impact of Textile Structures, Textile Research Journal, pp. 34-41, (Jan. 1973).

Roylance, Influence to Fibre Properties on Ballistic Penetration of Textiles panels, Fibre Science and Technology, vol. 14, pp. 183-190, (1981).

*Primary Examiner*—Thomas R. Hannon
*Attorney, Agent, or Firm*—Patrick L. Henry

[57] ABSTRACT

The present invention is an impact resistant composite and helmet made thereof. The helmet comprises an impact resistant composite shell. The composite shell comprises a plurality of prepreg packets. Each prepreg packet comprises at least about 2 and preferably 5 to 20 prepreg layers. There are from 2 to 50 and preferably 5 to 20 prepreg packets. Each prepreg layer comprises a plurality of unidirectional coplanar fibers embedded in a polymeric matrix. The fibers of adjacent layers in the prepreg packets are at an angle of from 45° to 90°, preferably 60° to 90°, more preferably 80° to 90° and most preferabaly about 90° from each other. The angle of the fiber in alternate layers is preferably, sustantially the same.

18 Claims, 3 Drawing Sheets

IMPACT RESISTANT HELMET

This is a continuation of application Ser. No. 081,075, filed Aug. 3, 1987, now abandoned.

BACKGROUND OF THE INVENTION

This invention is in the field of articles of manufacture made from composites; more particularly the invention relates to a helmet comprising an impact resistant composite shell.

Helmets having impact resistance and in particular ballistic impact resistance are known in the art. Attempts are continually made to improve the impact and ballistic resistance of such helmets.

A variety of helmets and methods for making helmets are described in publications such as U.S. Pat. No. 4,199,388 and G.B. Patent application No. 2,098,852. As shown in the UK reference attempts are continually made to design the composite using reinforced fabric cut from flat sheets which must be formed into the three dimensional spherical like shape of a helmet. The fibrous composite should be formed into a helmet without the fabric wrinkling. At the same time there should be no weaknesses along seams and edges in the fabric which occur to obtain a three-dimensional form.

In the design of composites made from high strength fibers a useful article of manufacture typically considered is a helmet. This is the case for example in commonly assigned U.S. Pat. Nos. 4,403,012,; 4,457,985; 4,501,856; 4,613,535; 4,623,574; 4,650,710 as well as commonly assigned filed patent applications having U.S. Ser. No. 081,260, filed Aug. 3, 1987 now U.S. Pat. No. 4,820,568 and U.S. Ser. No. 081,074, filed Aug. 3, 1987 now abandoned.

U.S. Pat. No. 4,309,487 discloses ballistic resistant laminates of polyethylene fibers where the fibers in each layer are unidirectional and at an angle to fibers in adjacent layers. The laminates are made in the absence of adhesives with each layer being at least 0.5 mils thick. A six inch by six inch square film laminate is disclosed in the Examples. U.S. Pat. No. 4,079,161 is of interest.

SUMMARY OF THE INVENTION

The present invention is an improved impact resistant helmet. The helmet comprises an impact resistant composite shell. The composite shell comprises a plurality of prepreg packets. Each prepreg packet comprises at least about 2 and preferably 5 to 20 prepreg layers. There are from 2 to 50 and preferably 5 to 20 prepreg packets. Each prepreg layer comprises a plurality of unidirectional coplanar fibers embedded in a polymeric matrix. The fibers of adjacent layers in the prepreg packets are at an angle of from 45° to 90°, preferably 60° to 90°, more preferably 80° to 90° and most preferably about 90° from each other. The angle of the fiber in alternate layers is preferably, substantially the same.

In a preferred embodiment the prepreg packets are initially flat and are cut into patterns to enable the prepreg packet to be formed into the shape of the shell. The pattern is cut so that upon being formed into the shape of the shell the prepreg packets have substantially no wrinkles. The prepreg packets have cuts or edges which are built in to the shell. The edges substantially come together to form a seam when the packet is formed into the shape of the three dimensional shell. Adjacent prepreg packets are positioned relative to each other so that the seams are offset and do not overlap.

The fibers preferably have a tensile modulus of at least 160 g/denier preferably at least 500 g/denier and an energy to break of at least 7 preferably at least 22 J/gram. The total shell preferably contains from 2 to 500, preferably 40 to 200, and more preferably, 40 to 150 prepreg layers.

The most preferred fibers are fibers having high tensile modulus of at least 500 grams/denier and an energy to break of at least 22 J/gram such is found in extended chain polyethylene and polyaramids.

DETAILED DESCRIPTION OF THE INVENTION

Figure 1:
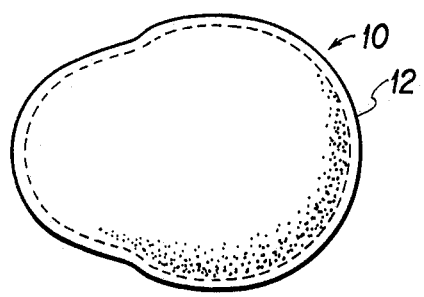
FIG. 1 is the top view of a helmet of the present invention.

The present invention will be understood by those skilled in the art by referenced to the accompanying drawings.

While the preferred embodiment of the present invention is described with reference to the accompanying FIGS. 1-8, these Figures illustrate only a preferred embodiment and should not limit the scope of the present invention.

The present invention is directed to a helmet 10 comprising an impact resistant composite shell 12. The design of the present invention has been made to take advantage of the improved impact resistant properties and in particular ballistic resistant properties found for composites in copending patent application U.S. Ser. No. 081,260, filed Aug. 3, 1987 hereby incorporated by reference. Composites made using high strength fibers result in improved ballistic resistance, where the fibers in adjacent layers are at an angle of from 45° to 90°, preferably 60° to 90°, more preferably 80° to 90°, and most preferably about 90° from each other. The angle of the fibers in alternate layers is preferably, substantially the same. The fibers in the composite can be relatively short having the length of up to 8 inches, preferably from 1 to 8 inches, more preferably 2 to 6 and most preferably 2 to 4 inches.

The helmet 10 of the present invention comprises an impact resistant composite shell 12. The composite shell is made of a plurality, at least 2 and preferably from 5 to 20 prepreg packets 14. Each prepreg packet 14 comprises at least 2 and preferably from 5 to 20 prepreg layers 16. Each prepreg layer comprises a plurality of unidirectional coplanar fibers 18 embedded in a polymer matrix 20. The fibers of adjacent layers in the prepreg packets are at an angle $\theta$ of from 45° to 90°, preferably 60° to 90°, more preferably 80° to 90°, and most preferably about 90° from each other. The angle of fiber in alternate layers is preferably, substantially the same.

The use of a plurality of prepreg packets is preferred since it is known from patent application Ser. No. 081,260 that composites containing layers where the fibers of adjacent layers are at angle of about 90° from each other have unexpectedly improved resistance to ballistic impact.

Figure 3:
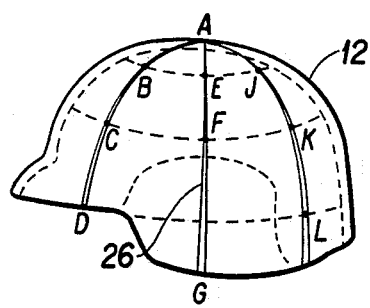
FIG. 3 is the side view of a helmet of the present invention showing a prepreg packet.
Figure 4:
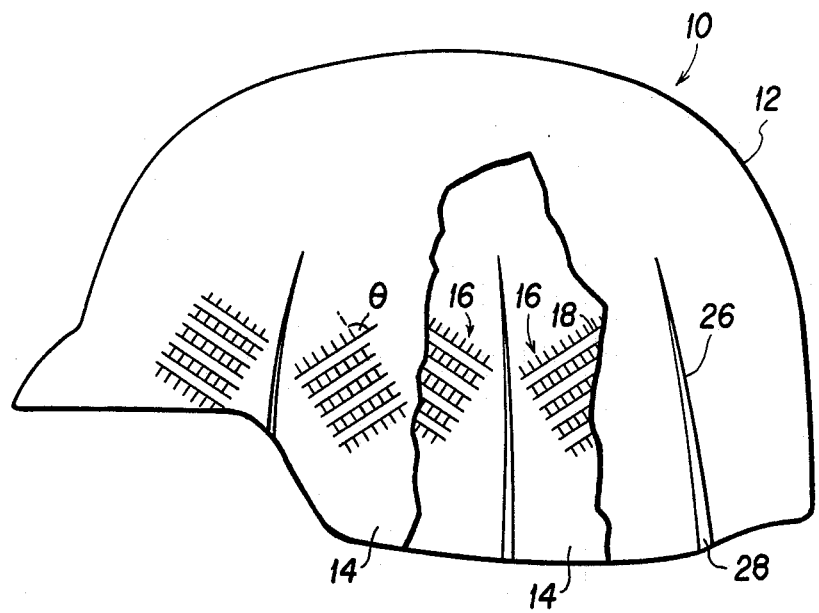
FIG. 4 is a schematic and break away view of a helmet of the present invention showing fiber direction in the prepreg layers.
Figures 5, 6:
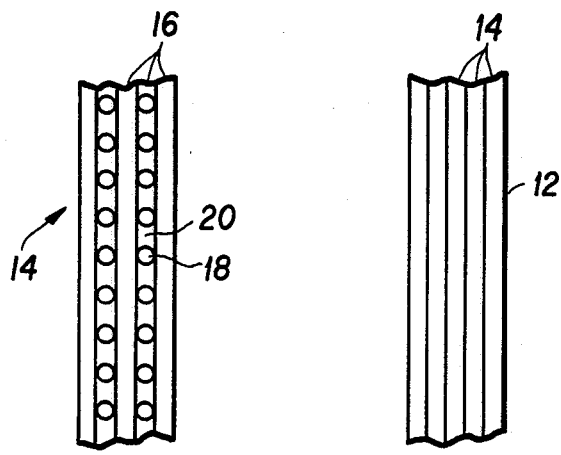
FIG. 5 is a cross-section of a portion of the helmet shell showing the prepreg packets.
FIG. 6 is a cross-section of a portion of a prepreg packet showing the prepreg layers.

The difficulty in taking advantage of this construction in three-dimensions is apparent when trying to make a shell 12 for helmet 10. Composites useful to make helmets are typically made in a flat form. In order to convert the flat composite to the three dimensional shape of the helmet shell the composite must be cut into a pattern. Whether the pattern is built of layers having the shape as shown in FIGS. 3 and 4 or is built from a multiple of pieces as indicated in GB patent application No. 2,098,852, the composite results in seams The pattern is cut otherwise a thick composite would result in unacceptable wrinkles in the helmet. In order to avoid the wrinkles and seams, a plurality of packets of layers is used and the seams are offset in the various packets of layers. The use of the thinner prepreg packets of layers avoid wrinkles and enables the seams in each packet of layers to be overlapped by other prepreg packets of layers in the composite. As a result satisfactory helmets have been made which have substantially no wrinkles or slight acceptable wrinkles and at the same time do not have any particular weak spots resulting from seams or boundaries of edges in the body of the helmet shell.

Figure 8:
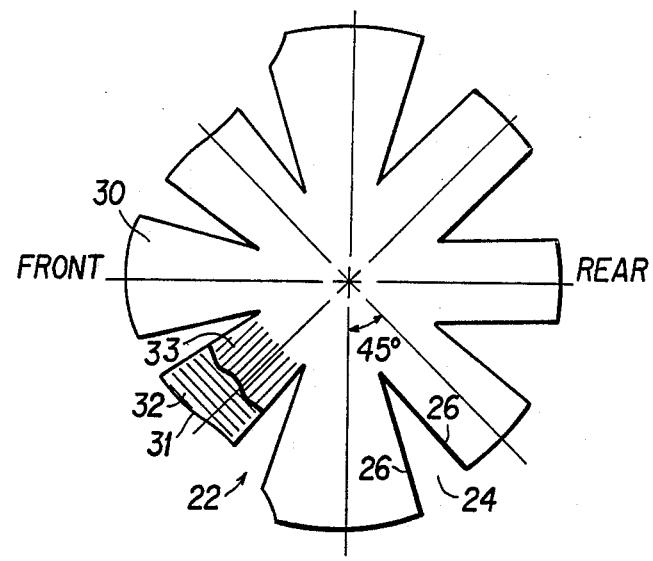
FIGS. 7 and 8 are a not to scale drawing of a prepreg packet cut into a pattern useful to make the shell of the helmet of the present invention.
Figure 7:
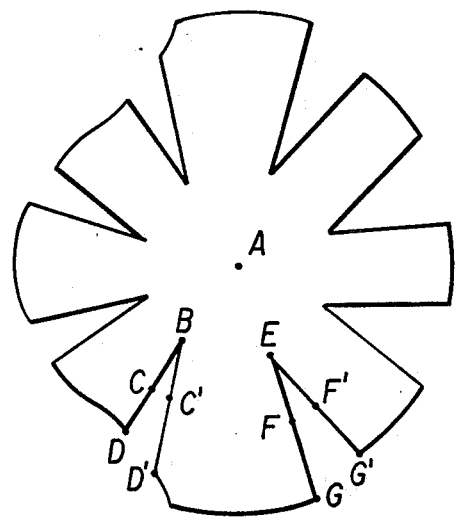

The helmet of the present invention maximizes the advantage of having prepreg layers 16 with fibers which are at the desired angle, most preferably at an angle of about 90° from the fibers in adjacent layers. Such a construction results in improved ballistic impact resistance The helmet uses packets 14 having a plurality of prepreg layers 16. Each prepreg layer 16 contains a plurality of unidirectional coplanar fibers embedded in the polymer matrix. The helmet has a plurality, at least 2 and preferably 5 to 20 packets 14 cut into patterns 22 such as shown in FIGS. 7 and 8. The patterns contain cuts such as cut 24 which enable the pattern to take a three-dimensional shape and have the cut portions having edges 26 which substantially close up to form seams 26 when formed into a shell 10. The shell 10 is built by a plurality of packets 14. The seams of adjacent packets are located so as not to overlap. FIGS. 7 and 8 show two different patterns used to avoid overlapping of seams 26 in the two packets.

The helmet of the present invention has substantially no wrinkles, minimization of weak seams, and at the same time adjacent prepreg layers which contain unidirectional fibers within each layer which are about at a desired angle, most preferably at an angle of about 90° angle from the fibers of the adjacent layers.

It is recognized that the angle of the fibers on the surface of adjacent packets may not be at about 90° from each other. For this reason it is desirable to maximize the number of layers in each packet and minimize the number of packets. This is done to the extent that the packets do not become so thick that unacceptable wrinkles develop, or cuts 24 result in seams which result in unacceptable weaknesses in the helmet.

FIGS. 7 and 8 show a preferred embodiment of a pattern 22 useful to make helmets 10 having shells 12. Prepreg layers such as layer 32 and 33 having unidirectional fibers are formed. The prepreg layers are than made into composite packets wherein the angle of the fibers of each prepreg layer of the packet is at about 90° from the angle of the fiber of each adjacent layer. The pattern shown in FIG. 4 contains cuts 24 which remove excess material in order to enable the pattern to take the shape of shell 12 with substantially no wrinkles and at the same time edges 26 of the cut 24 close up to form seams 28 as shown in FIG. 3 and 4. The remaining material between cuts 24 are lobes 30. Lobe 31 shows a schematic illustration of the 90° fiber direction in adjacent layers 32 and 33 which had been built up to form the packet that had been cut into the pattern. A plurality of patterns 22 can be "laid-up", that is placed upon one another and put into a suitable means to shape it into shell 12. This can be done by a compression type mold or a stamping mold. The helmets can also be molded in an autoclave. The helmets are preferably compression molded onto a suitable mold. Depending upon the material time, temperature and pressure parameters can vary. A preferred set of conditions for molding the helmets made using extended chain polyethylene fiber is at a pressure of from 30 to 90 tons, at a temperature of from 80°C. to 130°C. for from 15 minutes to 90 minutes and preferably 30 minutes to 45 minutes.

Although FIGS. 7 and 8 illustrate a preferred pattern containing eight lobes 30, it is recognized that the number of lobes can be varied as well as the thicknesses of each packet.

Useful and preferred materials to make the shells 12 of the present invention include high strength fibers and elastomeric polymeric matrix materials reviewed below.

The helmet of the present invention has improved impact resistance. The helmets are made of composites which preferably comprise high strength fibers having a tensile modulus of at least about 160 grams/denier and preferably at least about 500 grams/denier and a tenacity of at least about 7 grams/denier and preferably at least 22 grams/denier in a polymer matrix which is preferably an elastomeric matrix having a tensile modulus of less than about 20,000 psi, (measured at according to ASTM D638-84 at 25° C.).

For the purposes of the present invention, fiber is an elongated body, the length dimension of which is much greater than the transverse dimensions of width and thickness, Accordingly, the term fiber includes monofilament fiber, multifilament fiber, ribbon, strip, a plurality of any one of combinations thereof and the like having regular or irregular cross-section.

Depending on the application for use of the prepreg layer in the multilayer composite of the present invention different fibers and different matrices can be used. Useful fibers include polyolefin based polymers and particularly ultra high molecular weight polyolefin fibers including polethylene and polypropylene fibers. Other useful high strength fibers include aramid fibers, polyvinyl alcohol fibers and other high strength fibers. Also useful in the present invention are a variety of conventional fibers which would result in improvement in resistance to impact properties when used in accordance with the present invention. Such fibers include but are not limited to asbestos, carbon, graphite, boron, cellulose, alumina, and metal fibers.

Fiber useful in the present invention include hightly oriented ultra-high molecular weight polyethylene fiber, highly oriented ultra-high molecular weight polypropylene fiber, aramid fiber, polyvinyl alcohol fiber or combinations thereof. U.S. Pat. No. 4,457,985 generally discusses such oriented ultra high molecular weight polyethylene and polypropylene fibers, and disclosure of which is hereby incorporated by reference to the extent not inconsistent herewith. In the case of polyethylene, suitable fibers are those highly oriented fibers of weight average molecular weight of at least about 200,000, preferably at least about 500,000, more preferably at least about one million and most preferably between about two million and about five million. Known as extended chain polyethylene (ECPE) fibers, such fibers may be produced from polyethylene solution spinning processes described for example, in U.S. Pat. No. 4,137,394 to Meihuzen et al. or U.S. Pat. No. 4,356,138 to Kavesh et al., or spun from a solution to form a gel structure as described in German Off. No. 3,044,699, GB No. 2,051,667, and especially as described in U.S. Pat. No. 4,413,110.

As used herein, the term polyethylene shall mean a predominantly linear polyethylene material that may contain minor amounts of chain branching or comonomers not exceeding 5 modifying units per 100 main chain carbon atoms and that may also contain admixed therewith up to about 25 wt % of one or more polymeric additives such as alkene-1-polymers, in particular low density polyethylene, polypropylene or polybutylene, copolymers containing mono-olefins as primary monomers, oxidized polyolfins, graft polyolefin copolymers and polyoxymethylenes, or low molecular weight additives such as anti-oxidants, lubricants, ultra-violet screening agents, colorants and the like which are commonly incorporated therewith. Depending upon the fiber forming technique, the draw ratio and temperatures, and other conditions, a variety of properties can be imparted to these fibers. The tenacity of the fibers is ordinarily at least about 15 grams/denier, preferably at least about 25 grams/denier and most preferably at least about 30 grams/denier. Similarly, the tensile modulus of the fibers, as measured by an Instron tensile testing machine, is ordinarily at least about 300 grams/denier, preferably at least about 500 grams/denier, more preferably at least about 1,000 grams/denier and most preferably at least about 1,200, preferably 1,500 grams/denier. These highest values for tensile modulus and tenacity are generally obtainable only by employing solution spun or gel fiber processes. In addition, many ECPE fibers have melting points higher than the melting point of the polymer from which they were formed. Thus, for example, whereas ultra-high molecular weight polyethylenes of 500,000, one million and two million generally have melting points in the bulk of 138° C., the ECPE fibers made of these materials have melting points 7° to 13° C. higher. The increase in melting point reflect a higher crystalline orientation of the fibers as compared to the bulk polymer. Notwithstanding the contrary teachings in the prior art improved ballistic resistant articles are formed when polyethylene fibers having a weight average molecular weight of at least about 200,000, preferably at least about 500,000, a modulus of at least about 500 g/denier and a tenacity of at least about 15 grams/denier are employed. c.f. John V.E. Hansen and Roy C. Liable in "Flexible Body Armor Materials," Fiber Frontiers ACS Conference, June 10–12, 1974 (ballistically resistent high strength fibers must exhibit high melting point and high resistance to cutting or shearing); Roy C. Liable, Ballistic Materials and Penetration Mechanics, 1980 (noting that nylon and polyester may be limited in their ballistic effectiveness due to the lower melting point); and "The Application of High Modulus Fibers to Ballistic Protection", R. C. Liable, et al., J. Macromol, Sci. Chem., A7(1), pp. 295–322, 1973 (the importance of a high degree of heat resistance is again discussed).

In the case of polypropylene, highly oriented polypropylene fibers of weight average molecular weight at least about 300,000, preferably at least about 750,000, more preferably at least about one million and most preferably at least about two million may be used Ultra high molecular weight polypropylene may be formed into reasonably highly oriented fibers by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene Accordingly, a suitable tenacity is at least about 8 grams/denier, with a preferred tenacity being at least about 11 grams/denier. The tensile modulus for polypropylene is at least about 160 grams/denier preferably at least about 200 grams/denier. The melting point of the polypropylene is generally raised several degrees by the orientation process, such that the polypropylene fiber preferably has a main melting point of at least about 168° C., more preferably at least about 170° C. Employing fibers having a weight average molecular weight of at least about 750,000 coupled with the preferred ranges for the above-described parameters (modulus and tenacity) can provide advantageously improved performance in the final article especially in ballistic resistant articles, nothwithstanding the contrary teachings in the prior art). c.f. Liable, Ballistic Materials and Penetration Mechanics, supra, at p. 81 (no successful treatment has been developed to bring the ballistic resistance of polypropylene up to levels predicted from the yarn stress-strain properties); and in NTIS publication ADA018 958, "New Materials in Construction for Improved Helmets", A. L. Alesi et al. wherein a multilayer highly oriented polypropylene film material (without matrix), referred to as "XP", was evaluated against an aramid fiber (with a phenolic/polyvinyl butyral resin matrix); the aramid system was judged to have the most promising combination of superior performance and a minimum of problems of combat helmet development.

Aramid fiber is formed principally from the aromatic polyamide. Aromatic polyamide fibers having a modulus of at least about 400 grams/denier and tenacity of at least about 18 grams/denier are useful for incorporation into composites of this invention. For example, poly(-phenylenediamine terphalamide) fibers produced commercially by Dupont Corporation under the trade name of Kevlar ® 29 and 49 and having moderately high moduli and tenacity values are particularly useful in forming ballistic resistant composites. (Kevlar ® 29 has 500 grams/denier and 22 grams/denier and Kevlar ® 49 has 1000 grams/denier and 22 grams/denier as values of modulus and tenacity, respectively).

Polyvinyl alcohol (PV-OH), fibers having a weight average molecular weight of at least about 200,000, preferably at least about 550,000, more preferably between about 1,000,000 and about 4,000,000 and most preferably between about 1,500,000 and about 2,500,000 may be employed in the present invention. Usable fibers should have a modulus of at least about 160 grams/denier, preferably at least about 200 grams/denier, more preferably at least about 300 grams/denier, and a tenacity of at least about 7 grams/denier, preferably at least about 10 grams/denier and most preferably at least 17 grams/denier. PV-OH fibers having a weight average molecular weight of at least 200,000 about 500,000, a tenacity of at least about 200 grams/denier and a modulus of at least about 10 grams/denier are particularly useful in producing ballistic resistant composites. PV-OH fibers having such properties can be produced, for example, by the process disclosed in U.S. Pat. No. 4,599,267 to Kwon et al.

The fibers may be precoated with a polymeric material preferably an elastomer based material prior to being arranged as described above. The low modulus elastomeric material has a tensile modulus, measured at about 23° C., of less than about 20,000 and preferably less than 6,000 psi (41,400 kPa). Preferably, the tensile modulus of the elastomer is less than about 5,000 psi (34,500 kPa), and most preferably is less than about 2,500 (17,250 kPa) to provide even more improved performance. The glass transition temperature (Tg) of the elastomer (as evidenced by a sudden drop in the ductility and elasticity of the material) should be less than about 0° C. Preferably, the Tg of the elastomer is less than about −40° C., and more preferably is less than about −50° C. The elastomer should have an elongation to break of at least about 50%. Preferably, the elongation to break is at least about 100%, and more preferably, it is about 300% for more superior performance.

A wide variety of elastomeric materials and formulations may be utilized in this invention Representative examples of suitable elastomers have their structures, properties, and formulations together with crosslinking procedures summarized in the Encyclopedia of Polymer Science, Vol. 5, "ElastomersSynthetic"(John Wiley & Sons Inc., 1964). The essential requirement is that the matrix materials of this invention have appropriately low moduli as noted above. For example, any of the following materials may be employed: polybutadiene, polyisoprene, natural rubber, ethylene-propylene copolymers, ethylene propylene-diene terpolymers, polysulfide polymers, polyurethane elastomers, chlorosulfonated polyethylene, polychloroprene, plasticized polyvinylchloride using dioctyl phthalate or other plasticers well known in the art, butadiene acrylonitrile elastomers, poly(isobutylene-co-isoprene), polyacrylates, polyesters, polyethers, fluorelastomers silicone elastomers, thermoplastic elastomars, copolymers of ethylene.

Particularly useful are block copolymers of conjugated dienes and vinyl aromatic monomers Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)n(n=2–10) or radial configuration copolymers of the type R−(BA)X(x-=30–150); wherein A is a block from a polyvinyl aromatic monomer and B is a block from a conjugated diene elastomer. Useful polymers are produced commercially by the Shell Chemical Co. and described in the bulletin "Kraton Thermoplastic Rubber", SC-68-8.

The low modulus elastomeric material may be compounded with fillers such as carbon black, silca, glass microballoons, etc. up to an amount not to exceed about 300% by weight of elastomer, preferably not to exceed about 100% by weight and may be extended with oils and vulcanized by sulfur, peroxide, metal oxide or radiation cure systems using methods well known to rubber technologists of ordinary skill. Blends of different elastomeric materials may be used together or one or more elastomer materials may be blended with one or more thermoplastics. High density, low density, and linear low density polyethylene may be cross-linked to obtain a material of appropriate properties, either alone or as blends. The modulus of such a modified compound refers to the total matrix composition.

The proportion of coating on the coated fibers or fabrics may vary from relatively small amounts (e.g. 1% by weight of fibers) to relatively large amounts (e.g. 150% by weight of fibers), depending upon whether the coating material has impact or ballistic-resistant properties, and upon the rigidity, shape, heat resistance, wear resistance, flammability resistance and other properties desired for the composite article. In general, ballistic-resistant articles of the present invention containing coated fibers should have a relatively minor proportion of coating since the ballistic-resistant properties are almost entirely attributable to the fiber. Nevertheless, coated fibers with higher coating contents may be employed. Useful amounts of coating, based upon the weight of the fiber range from 5 to 100, preferably 10 to 50, and most preferably 10 to 30 percent.

The coating may be applied to the fiber in a variety of ways. One method is to apply the resin of the coating material to the stretched high modulus fibers either as a liquid, a sticky solid or particles in suspension, or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor before the high temperature stretching operation, either before or after removal of the solvent from the fiber. The fiber may then be stretched at elevated temperatures to produce the coated fibers. The extruded gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

The fiber used in the present invention, as indicated above can be monofilament fiber, multifilament fiber, ribbons, strip or combinations thereof. The fiber can have regular or irregular cross-section. The fiber can be in the form of a monofilament or multifilament yarn. It can be twisted or untwisted.

The fibers in the fibrous elements used to form the prepreg layers of the present invention are preferably arranged unidirectionally in that each fiber is parallel to an adjacent fiber. The fibrous web is impregnated with a polymeric material to form the prepreg layer. The prepreg layer can be continuous or cut so that the longest continuous fiber in the layer is from up to 8 and preferably 2 to 6 inches and most preferably 2 to 4 inches in length.

The prepreg layer of the present invention is made of at least two adjacent coplanar fibrous elements. The impregnated fiber elements are laid up and connected at their boundaries. Preferably they are butted together and result in the coplanar prepreg layer of the present invention The elements are connected through the polymer matrix.

A typical process to make the elements useful for prepreg layers of the present invention comprises the steps of bringing the yarn laid in the unidirectional sheet form into contact with the matrix resin. The matrix resin can be in the form of solution, emulsion or melt. The next step is to consolidate the resin impregnated sheet. This can be accomplished by drying to remove the solvent or cooling to solidify the melt. The prepreg sheet is then rewound and cut for use in accordance with the present invention.

Suitable matrix materials include polyethylenes, cross-linked polyethylenes, polypropylenes, ethylene copolymers, propylene copolymers and other olefin polymers and copolymers. Examples of such other matrix materials include unsaturated polyesters, phenolics, polybutyrals, epoxy resins and polyurethane resins and other low modulus resins ourable below the melting point of the fiber.

The proportion of matrix to fiber is variable for the composites, with matrix material amounts of from about 5% to about 150%, by weight of fibers, representing the broad general range. Within this range, it is preferred to use composites having a relatively high fiber content, such as composites having only 10-50% matrix material, by weight of fibers, and more preferably 10-30% matrix material Stated another way, the fiber network occupies different proportions of the total volume of the composite. Preferably, however, the fiber network comprises at least about 30 volume percent of the composite. For ballistic protection, the fiber network comprises at least about 50 volume percent, and most preferably at least about 70 volume percent, with the matrix occupying the remaining volume.

Composites made using the prepreg layer are made using the above-described fibrous elements. A preferred way to make the prepregs is to lay-up individual layers and heat them and form them into the desired configuration. Suitable means include compression molding, stamping, or heating under pressure within an autoclave.

One technique for forming a composite includes the steps of arranging prepreg layers into a desired structure. The prepreg packets are made and then the composite by laying up the packets. The composite is then heated under pressure to cause the matrix material to flow and occupy any void spaces. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The construction of the prepreg layer of the present invention results in a layer having unidirectional fibers. When these fibers are used to form a multilayer composite of at least 2, and preferably from 2 to about 500, more preferably 40 to 150 layers and most preferably 60 to 120 layers they have improved ballistic impact resistance. An advantage is where the boundaries of the elements between each packet are offset from each other so as to not to have flaws or weak points.

The prepreg layers of the present invention contain from 5 to 30 fiber ends per inch and preferably 10 to 20 per inch. Each layer is typically from 0.0001 to 0.015, preferably 0.0005 to 0.01, more preferably 0.0005 to 0.005 and most preferably 0.0005 to 0.0025 inches thick. Layers having these dimensions are particularly useful when made of extended chain polyethylene having a yarn of about 1200 denier/118 filaments. The areal density is used to indicate the amount of fiber and/or resin per unit area of the prepreg layer. It is determined by the number of yarn strands laid per unit width of prepreg sheet and the amount of resin applied to the yarn. Typically if a 1200 denier/118 filament yarn is laid by 15 ends per inch the yarn areal density in the prepreg sheet would be about 79 grams per square meter.

The preferred prepreg layer of the present invention is preferably stacked in a zero/90° sequence. The helmet of the present invention requires at least two prepreg packets. The adjacent layers of adjacent packets will have a different angle than the angle between fibers in adjacent layers within a packet. This could weaken the ballistic composite to the extent of the number of these packet interfaces. It is desirable to minimize the number of these interfaces by minimizing the number of packets. This is balanced against the weaknesses at the seams if there are too few layers. Depending upon the materials used, and the amount of protection needed, this balance can be optimized with routine experimentation.

It has been found that a helmet made of a lower modulus matrix material, such as one having lower ASDM-D-638 tensile, modulus such a modulus of less than about 20,000 psi, preferably less than about 6,000 psi, is more resistant to a delamination of layers upon ballistic impact than a helment made using a matrix polymer having a high tensile modulus matrix material However, helmets made using lower modulus materials are not as stiff or rigid as helmets made using high modulus materials, i.e., a tensile modulus greater than 6,000 preferably greater than 20,000 psi. Accordingly, the present invention includes a composite, and helmet made of a composite, having separate layers made using different matrix materials in the different layers. Higher modulus matrix materials are used to provide regiidity and lower modulus matrix to resist delamination. Preferably the composite has one or more of the higher modulus matrix resin containing layers on at least one surface and optionally both outer surfaces. In the application for use in a helmet, the composite is designed so that there is at least one and preferably at least two prepreg packets having higher modulus matrix material on the outside of the helmet. There is at least one and preferably at least two lower modulus matrix material containing prepreg packets on the inside of the composite. This provides a helmet having rigidity and lamination resistance.

In an alternate embodiment, the above result can be attained by varying the angle of fibers of adjacent prepreg layers in different prepreg packets. The packets with the angle of fibers in adjacent layers within the packets closer than 90° are more rigid than packets with lower angels between fibers in adjacent layers. A prepreg packet having fiber adjacent layers at an angle of from 90° down to but not including 45°, and preferably 90° from each other is more rigid than a packet having adjacent layers of fibers where the fibers in adjacent layers have a lower angle between fibers in adjacent layers. The angle can be lower than 90°, in the range of from 45° up to, but not including 90°. Accordingly, the present invention includes a composite, and helmet made of a composite made with separate prepreg packets. The angles between the fibers in the layers of each packet vary from packet to packet preferably there are at least two packets having different angles between layers in the packets.

Preferably, the composite has one or more of the rigid packets, having an angle closer to 90° between fiber in adjacent layers on at least one surface and optionally both outer surfaces. In the application for use in a helmet the composite is designed so that there is at lease one and preferably at least two prepreg packets having the packets with high angles between fibers in adjacent layers in the outside of the helmet. There is at least one and preferably at least two packets having a lower angle between fibers in adjacent layers on the inside of the composite. This balances rigidity and lamination resistance.

The following examples are set forth below to illustrate the nature of the invention and method of carrying it out. However, the invention should not be considered limited to the details thereof.

EXAMPLE 1

Figure 2:
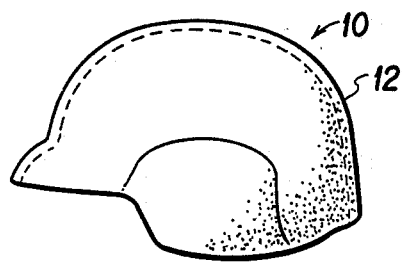
FIG. 2 is the side view of a helmet of the present invention.

This example illustrates the procedures for fabrication of a typical military helmet of medium size. FIGS. 1 and 2 show the general view of this type of helmet. The shell of this helmet was made of 8 prepreg packets. Each packet was made using 12 prepreg layers. The prepreg layers were made using Spectra® 900 extended chain polyethylene yarn produced by Allied Corporation. This material is indicated by Allied to have the following typical properties. This material is yarn which has a tenacity of approximately 29.5 g/denier, a modulus of approximately 1250 g/denier, and an energy to break of approximately 55 Joules/gram, a yarn denier of approximately 1200 and an individual filament denier of approximately 10 (118 filaments, untwisted yarn). The prepreg layers were made by feeding yarn from a creel to form a web of yarn about 7 inches wide and having about 10 yarn ends per inch. The prepreg layers were made using the yarn which was pulled from creels and coated with Kraton D-1107 which is a styrene-isoprene-styrene block copolymer (SIS). This material is sold by the Shell Chemical Company and is described in the bulletin *Kraton Thermoplastic Rubber, typical property guide Kraton D and Kraton G*. It is indicated to have the No. SC:68-81. The specific Kraton D resin used was Kraton D-1107 which has a glass transition temperature of −55° C. The polymer has a reported melt index of 9 g/10 min. at ASTM 1238 Condition G, and a Modulus tested using ASTM-D462 with a jaw separation speek of 10 in/min of 100 psi at 300% elongation. The coating comprised a homogeneous solution of 6% Kraton D-1107 and about 94% by weight of methylene chloride. The yarn web was supported on a silicone coated release paper and was pulled through a pair of nip rolls with a gap setting of approximately 0.026 inches. The embedded yarn was passed through a gas fired hot air oven at an air temperature of 90° C. and the solvent evaporated. The resin impregnated sheet was wound with the release paper. The resin impregnated sheet was peeled from the release paper and measured to be approximately 7 inches wide and have a thickness of approximately 0.004 inches. The prepreg sheet contains 63% by weight of unidirectionally yarn and about 37% by weight of the Kraton D-1107.

The prepreg layers were then cut and formed into squares approximately 21"×21". The layers were laid up to form prepreg packets consisting of 10 sheets which was stacked with the fibers in adjacent angles at 90° from each other. The packets were molded at 110° C. at 30 tons for about 30 minutes. The molded packets were cut according to the design patterns shown in FIGS. 7 and 8. The total area of the packet pattern succeedingly increased as the packets went from the inside of the shell to the outside of the shell. The packet shown in FIG. 7 had an approximate diameter at the greatest distance from the center of about 19 inches. Suitable shape cutout was made over the visor and provision was provided for an air muff type section. The pattern had eight lobes. The prepreg packets were then stacked. All odd number packets were cut according to FIG. 7 and even number packets according to FIG. 8 so that the seams of adjacent packets would not overlap. A total of eight packets was used having a total number of layers was 96.

The prepreg packets were draped over the core or male portion of the mold which was preheated to about 50° C. As soon as the mold was closed, the mold temperature was raised to 120° C. while 75 tons of pressure was applied. The mold was subsequentially cooled to room temperature. The stamped helmet shell was edge trimmed. The helmet weighed about two pounds with an average wall thickness of about 0.31 inches. In considering the patterns as shown in FIGS. 7 and 8, the pattern is cut so that the sheet should conform to the configuration of the helmet without wrinkling or thickening especially near the ear muff section of the helmet shell. Geometric mapping of the helmet shell is useful with the design of the pin wheel construction. FIG. 3 shows a point A at the top of the crown and meridial lines drawn around the helmet. Eight meridial lines were drawn 45° apart. Latitude lines are also plotted and the distance between neighboring lateral line neighboring lines is the same. For example, the distance from A to B is the same as from A to E and A to J. Similarly, B to C is equal to E to F is equal to J to K. After the lines are marked on the surface of the helmet shell, an approximate pattern will be cut from a flat sheet into a pin wheel configuration. The cut sheet is shown in FIGS. 7 and 8. Sometimes a minor adjustment in cutting is necessary in order to conform to the exact shape of the helmet because of the complexity of shell geometry. It is noted that seams form along lines such as E, F, and G. Adjacent packets formed into the shell have meridial cuts made at different locations on the pattern to avoid overlapping of the seams of adjacent patterns. This minimizes weakness due to the seams.

Ballistic performance of this helmet was evaluated at H.P. White Laboratory, Inc. Firings were conducted in accordance with the general provisions of NIL-STD662D with 0.22 caliber, type 2, 17-grain fragment simulators conforming to MIL-P-46593A. The V50 was measured to be 2,093 ft/sec. V50 is the velocity at which at least 50% of the fragments are stopped by the target. Military specifications for helmets of this type is a V50 of 2000 ft/sec.

COMPARATIVE

Example 1 was repeated except that Spectra® 1000 based fabric was used. Spectra® 1000 is produced by Allied Corporation and is reported to have a yarn tenacity of approximately 33 g/denier, a modulus of approximately 1250 g/denier, and energy to break of approximately 55 Joules per gram, a yarn denier of approximately 650 and an individual filament density of approximately 5.5 (118 filaments, untwisted yarn). The yarn was formed into a fabric using a plain weave at 34×34 ends per inch (13.4×13.4 ends per centimeter). The fabrics were embedded in Kraton D-1107. The total weight of fabric was 65% and that of resin was 35%. A total of 26 layers of fabric was used to mold the helmet and each layer of fabric was cut into eight lobes identical to those shown in Example 1. The thickness of the helmet was about 0.31 inches. The V50 was measured in accordance with the procedure of Example 1 to be 1868 ft/sec. This is inferior to that used in Example 1. It is noted that Spectra® 1000 has better tensile properties than the Spectra® 900 used in Example 1.

EXAMPLE 2

Example 1 was repeated with the exception that the helmet was made from 23 prepreg packets. Each prepreg packet consisted of four prepreg layers with a total of 92 layers. The helmet weighed 2.1 lbs. with approximately 63% yarn and 37% resin. The thickness of the helmet was approximately 0.31 inches. The V50 was measured to be 2,120 ft/sec.

While examplary embodiments of the invention have been described, the true scope of the invention is to be determined from the following claims.

What is claimed is:

1. A helmet comprising an impact resistant composite shell comprising a plurality of prepreg packets where each prepreg packet comprises at least 2 prepreg layers, with each prepreg layer comprising a plurality of undirectional coplanar fibers embedded in a ploymeric matrix, the fibers of adjacent layers in the prepreg packets being at an angle of about 45° to 90° from each other, wherein the angle of fibers of adjacent layers in at least two different prepreg packets is different.

2. The helmet is recited in claim 1 wherein the fibers of adjacent layers in the prepreg packet are at an angle of about 90° from each other.

3. The helmet as recited in claim 1 wherein the prepreg layer comprises an array of at least two adjacent coplanar fibrous elements, with each element comprising a plurality of unidirectional fibers embedded in a ploymeric matrix, the fibers being up to eight inches in length, the adjacent elements connected by the polymer matrix.

4. The helmet as recited in claim 3 wherein the fibers are from about two to about six inches long.

5. The helmet as recited in claim 1 wherein the fibers have a tensile modulus of at least about 160 g/denier and an energy to break of at least 7 J/gram.

6. The helmet as recited in claim 1 wherein each prepreg packet comprises from 5 to 20 prepreg layers.

7. The helmet as recited in claim 1 wherein the composite shell comprises from 2 to 50 prepreg packets.

8. The helmet as recited in claim 1 wherein the fiber is selected from the group consisting of polyolefins, polyvinyl alcohol, polyaramids, and combinations thereof.

9. The helmet as recited as in claim 8 wherein there are from 40 to 150 layers.

10. The helmet as recited in claim 1 wherein there are from 2 to 500 prepreg layers.

11. The helmet as recited in claim 1 wherein the tensile modulus of the polymeric matrix of at least two of the prepreg packets is different.

12. The helmet as recited in claim 1 wherein the shell has an inside and an outside and wherein the shell made of the at least two outer prepreg packets have a greater angle between adjacent layers than the angle of the other layers in prepreg packets of the shell.

13. A helmet comprising an impact resistant composite shell comprising a plurality of prepreg packets where each prepreg packet comprises at least 2 prepreg layers, with each prepreg layer comprising a plurality of unidirectional coplanar fibers embedded in a polymeric matrix, the fibers of adjacent layers in the prepreg packets being at an angle of about 45° to 90° from each other and wherein the prepreg packets are flat and are cut into patterns to enable the prepreg packet to be formed into the shape of the shell, and the cuts in the pattern being made so that upon being formed into the shape of the shell the prepreg packets having substantially no wrinkles with the cuts having adjacent edges which substantially come together to form a seam, adjacent prepreg packets having seams which do not overlap.

14. A helmet comprising an impact resistant composite shell comprising a plurality of prepreg packets where each prepreg packet comprises at least 5 prepreg layers, with each prepreg layer comprising a plurality of unidirectional coplanar fibers embedded in a polymeric matrix, the fibers of adjacent layers in the prepreg packets being at an angle of about 45° to 90° from each other, wherein the angle of fiber in alternate prepreg layers of a prepreg packet is substantially the same.

15. The helmet as recited in claim 14 wherein the shell has an inside and an outside and wherein the outside of the shell comprises at least two outer prepreg packets having a polymer matrix with a higher tensile modulus than the polymer matrix of the outer layers of the shell.

16. An impact resistant composite comprising a plurality of prepreg packets where each prepreg packet comprises at least 2 prepreg layers, with each prepreg layer comprising a plurality of unidirectional complanar fibers embedded in a polymeric matrix, the fibers of adjacent layers in the prepreg packets being at an angle of about 45° to 90° from each other, wherein the polymer matrix of different prepreg layers have different tensile modulii, wherein the angle of fiber in adjacent layers in at least tow prepreg packets is different.

17. An impact resistant composite comprising a plurality of prepreg packets where each prepreg packet comprises at least 2 prepreg layers, with each prepreg layer comprising a plurality of unidirectional coplanar fibers embedded in a polymeric matrix, the fibers of adjacent layers in the prepreg packets being at an angle of about 45° to 90° from each other, wherein the polymer matrix of different prepreg packets have different tensile modulii, wherein the angle of fiber in adjacent layers in at least two prepreg packets is different.

18. An impact resistant composite comprising a plurality of prepreg packets where each prepreg packet comprises at least 2 prepreg layers, with each prepreg layer having a plurality of unidirectional coplanar fibers embedded in a polymer matrix, the fibers of each prepreg packets being at an angle of about 45° to 90° from to each other, wherein the angle between fibers of different prepreg packets is different, wherein the angle of fiber in adjacent layers in at least two prepreg packets is different.

* * * * *

UNITED STATES PATENT AND TRADEMARK OFFICE
CERTIFICATE OF CORRECTION

PATENT NO. : 4,953,234
DATED : September 4, 1990
INVENTOR(S) : Hsin L. Li and Dusan C. Prevorsek It is certified that error appears in the above-identified patent and that said Letters Patent is hereby corrected as shown below:

Column 14, line 47; "outer" should read -- other --.

Column 14, line 52; "complanar" should read -- coplanar --.

Signed and Sealed this

Fourth Day of February, 1992

Attest:

HARRY F. MANBECK, JR.

*Attesting Officer*  *Commissioner of Patents and Trademarks*